(12) United States Patent
Cavallari (10) Patent No.: US 12,169,688 B2
(45) Date of Patent: *Dec. 17, 2024

(54) AUTOMATIC CONTENT LABELING (71) Applicant: PayPal, Inc., San Jose, CA (US)

(72) Inventor: Sandro Cavallari, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,199

(22) Filed: Oct. 3, 2023

(65) Prior Publication Data
US 2024/0143917 A1  May 2, 2024

Related U.S. Application Data (63) Continuation of application No. 17/014,636, filed on Sep. 8, 2020, now Pat. No. 11,822,883.

(51) Int. Cl.
| G06F 40/20 | (2020.01) |
| G06F 16/33 | (2019.01) |
| G06F 18/2413 | (2023.01) |
| G06F 40/40 | (2020.01) |
| G06F 40/47 | (2020.01) |
| G06F 40/58 | (2020.01) |

(Continued)

(52) U.S. Cl.
CPC .......... G06F 40/20 (2020.01); G06F 16/3347 (2019.01); G06F 18/24147 (2023.01); G06F 40/40 (2020.01); G06F 40/47 (2020.01); G06F 40/58 (2020.01); G06N 20/00 (2019.01); G06F 40/30 (2020.01)

(58) Field of Classification Search
None
See application file for complete search history.

(56) References Cited

U.S. PATENT DOCUMENTS

| 11,822,883 | B2 * | 11/2023 | Cavallari | .......... G06F 18/24147 |
| 2012/0323968 | A1 * | 12/2012 | Yih | .......... G06F 16/31 |
| | | | | 707/E17.069 |
| 2020/0279105 | A1 * | 9/2020 | Muffat | .......... G06N 3/08 |

(Continued)

OTHER PUBLICATIONS

Adiwardana D., et al., "Towards a Human-like Open-Domain Chatbot," arXiv:2001.09977v3 [cs.CL], Feb. 27, 2020, 38 pages.

(Continued)

*Primary Examiner* — Antim G Shah (57) ABSTRACT

Techniques are disclosed relating to natural language processing. In some embodiments, a computer system receives unlabeled content. In some embodiments, the computer system embeds, using a machine learning model, the unlabeled content, where the embedding generates an unlabeled vector. In some embodiments, the computer system determines, from a plurality of labeled vectors stored in a vector index, a first set of labeled vectors that match the unlabeled vector, where the first set of labeled vectors are generated from a set of labeled content stored in a database. In some embodiments, the computer system assigns a new label to the unlabeled content, where the new label is selected from the first set of labeled vectors. In some embodiments, the computer system stores the newly labeled content in the database. The disclosed techniques may advantageously provide for automatically labeling content based on its semantic rather than its syntactic meaning.

20 Claims, 9 Drawing Sheets (51) Int. Cl.
*G06N 20/00* (2019.01)
*G06F 40/30* (2020.01)

(56) References Cited

U.S. PATENT DOCUMENTS

| | | | | |
|---|---|---|---|---|
| 2021/0350082 | A1* | 11/2021 | Huang | G06N 5/04 |
| 2022/0019741 | A1* | 1/2022 | Roy | G06F 40/30 |
| 2022/0147717 | A1* | 5/2022 | Jones, Jr. | G06F 18/22 |

OTHER PUBLICATIONS

Artetxe M., et al., "Margin-Based Parallel Corpus Mining With Multilingual Sentence Embeddings," arXiv:1811.01136v2 [cs.CL], Aug. 7, 2019, 7 pages.
Artetxe M., et al., "Massively Multilingual Sentence Embeddings for Zero-Shot Cross-Lingual Transfer and Beyond," arXiv:1812.10464v2 [cs.CL], Sep. 25, 2019, 14 pages.
Chatterjee A., et al., "Intent Mining from Past Conversations for Conversational Agent," arXiv:2005.11014v1 [cs.CL], May 22, 2020, 8 pages.
Conneau A., et al., "Supervised Learning of Universal Sentence Representations from Natural Language Inference Data," Proceedings of the 2017 Conference on Empirical Methods in Natural Language Processing, Sep. 2017, pp. 670-680.
Devlin J., et al., "BERT: Pre-training of Deep Bidirectional Transformers for Language Understanding", Proceedings of the 2019 Conference of the North American Chapter of the Association for Computational Linguistics: Human Language Technologies, 2019, Minneapolis, Minnesota, https://arxiv.org/pdf/1810.04805.pdf">https://arxiv.org/pdf/1810.04805.pdf, pp. 4171-4186.
Goyal A.K., "Fast and Scalable Expansion of Natural Language Understanding Functionality for Intelligent Agents," Proceedings of NAACL-HLT, Jun. 2018, pp. 145-152.
Johnson J., et al., "Billion-scale Similarity Search With GPUs," arXiv:1702.08734v1 [cs.CV], Feb. 28, 2017, 12 pages.
Koehn P., "Europarl: A Parallel Corpus for Statistical Machine Translation," Proceedings of Machine Translation Summit X: Papers, 2005, 8 pages, Retrieved from the Internet: URL: http://www.statmt.org/europarl/.
Liu Y., et al., "ROBERTa: A Robustly Optimized BERT Pretraining Approach," arXiv:1907.11692v1 [cs.CL], Jul. 26, 2019, 13 pages.
Mallinar N., et al., "Bootstrapping Conversational Agents With Weak Supervision," arXiv:1812.06176v1 [cs.AI], Dec. 14, 2018, 6 pages.
Pagliardini M., et al., "Unsupervised Learning of Sentence Embeddings Using Compositional n-Gram Features," arXiv:1703.02507v3 [cs.CL], Dec. 28, 2018, 13 pages.
Raghavan U.N., et al., "Near Linear Time Algorithm to Detect Community Structures in Large-Scale Networks," Physical Review E, Sep. 19, 2007, vol. 76, No. 3, 12 pages, Retrieved from the Internet: URL: https://arxiv.org/abs/0709.2938.
Reimers N., et al., "Sentence-BERT: Sentence Embeddings using Siamese BERT-Networks", Retrieved from Internet URL: https://arxiv.org/abs/1908.10084, Aug. 27, 2019, 11 pages.
Roller S., et al., "Recipes for Building an Open-Domain Chatbot," arXiv:2004.13637v2 [cs.CL], Apr. 30, 2020, 25 pages.
Schwenk H., et al., "CCMatrix: Mining Billions of High-Quality Parallel Sentences on the WEB," arXiv:1911.04944v2 [cs.CL], May 1, 2020, 13 pages.
Shi C., et al., "Auto-Dialabel: Labeling Dialogue Data with Unsupervised Learning," Proceedings of the 2018 Conference on Empirical Methods in Natural Language Processing, 2018, pp. 684-689.
Sutskever, Ilya et al. "Sequence to sequence learning with neural networks" Advances inneural information processing systems, pp. 3104-3112, 2014.
Wang B., et al., "SBERT-WK: A Sentence Embedding Method by Dissecting BERT-based Word Models," arXiv:2002.06652v2 [cs.CL], Jun. 1, 2020, 12 pages.
Williams J.D., et al., "Rapidly Scaling Dialog Systems with Interactive Learning," Natural Language Dialog Systems and Intelligent Assistants, Springer, 2015, 12 pages.
Zhu X., "Semi-Supervised Learning Literature Survey," Computer Sciences TR 1530, University of Wisconsin—Madison, Jul. 19, 2008, 60 pages.
Ziemski M., et al., "The United Nations Parallel Corpus v1.0," Proceedings of the Tenth International Conference on Language Resources and Evaluation (LREC'16), 2016, 5 pages, Retrieved from the Internet: URL: https://conferences.unite.un.org/UNCorpus/Content/Doc/un.pdf.

* cited by examiner

AUTOMATIC CONTENT LABELING

CROSS REFERENCE TO RELATED APPLICATION

The present invention is a Continuation of U.S. patent application Ser. No. 17/014,636, filed Sep. 8, 2020, and the disclosure of which are incorporated herein by reference in its entirety.

BACKGROUND

Technical Field

This disclosure relates generally to data retrieval systems, and, more specifically, to techniques for automatically labeling content based on semantic similarity e.g., for use in training natural language processing (NLP) systems.

Description of the Related Art

In order to utilized increasing amounts of big data for use in predicting future trends including, for example, in machine learning techniques, such data needs to be labeled. That is, machine learning techniques rely on labeled data as opposed to unlabeled data. Due to the time-consuming nature of manual generation of labels by human annotators, labeled datasets used by NLP systems are often small. In addition, such datasets often include data that has been erroneously labeled by human annotators due to the polysemantic nature of written language. Not only can it be difficult for an annotator to identify the semantic meaning behind text, for example, but also multiple annotators may be needed to generate labels for data in different languages. Monitoring annotated data to identify errors in annotations may be difficult as well as time consuming.

DETAILED DESCRIPTION

Techniques are disclosed for automatically propagating labels across large sets of unlabeled content, including content in various different languages, based on a small set of labeled content. Unlabeled content may include any of various forms of user-generated content for which relevant labels are not yet known or have not yet been generated. As used herein, the term "user-generated content" is intended to be construed according to its well-understood meaning, which includes various forms of information generated by various users via online platforms. Such content may include both written or spoken content. For example, user-generated content may include a phrase spoken by a user, text from an email, personal messages, images, audio, documents uploaded to a user's computer, text entered into a search engine, etc. Thus, huge amounts of unlabeled user-generated content may be available for processing.

Traditionally, labels for content are provided through manual annotation e.g., by a human. Consequently, only a small set of labeled content may be available due to the cost associated with manual generation of such labels. For some languages, such as English, a small set of labeled content may be readily available. In other languages, however, fewer labels may be available. In some situations, different semantic meanings of various content may mislead a human annotator, especially when different portions of content are generated by users in different languages. That is, not only does an annotator need to understand the syntactic meaning (which may be based on keywords) of user-generated content in multiple languages, but also the semantic meaning.

The disclosed techniques leverage a small set of annotated data in order to mine high-quality training examples from an extensive collection of unlabeled content. In order to propagate labels to unlabeled content, the disclosed techniques employ a multi-lingual, vector-based information retrieval (IR) system. Unlike traditional IR systems which retrieve data based on keywords, the disclosed IR system retrieves labeled content that matches unlabeled content by searching in the vector space instead of the text space. Once it has obtained a set of matching labeled content, the disclosed IR system selects a label for the unlabeled content from this set of labeled content. Such techniques may advantageously allow for automatic determination of labels for content based on its semantic meaning rather than its syntactic meaning. In addition, the vector space allows for comparison of vectors generated from content in different languages. In order to perform comparisons in the vector space, the disclosed techniques embed content into vector form using machine learning (e.g., machine translation tools). Once unlabeled content has been embedded into vector form, this vector is directly compared to an index of labeled vectors generated from a database of labeled content for propagating a label. In this same way, the disclosed IR system is configured to retrieve semantically similar labeled content given an unlabeled input query. In addition to processing content in different languages, the disclosed automated labeling techniques may advantageously identify content that has been mislabeled by a human annotator and provide a new, accurate label for the content.

A purpose of the disclosed vector-based IR system is to mine high-quality labeled examples from corpora of customer-generated data for training a machine learning classifier e.g., for use in NLP systems. For example, user-generated content that is automatically labeled using the disclosed techniques may advantageously be used to train machine learning classifiers, which in turn may be used in NLP systems such as speech recognition systems, including chatbots, hate speech detectors, etc. These sets of automatically labeled content may advantageously improve the accuracy of NLP systems relative to traditional language processing techniques such as those that use search term libraries, for example.

Example Label Propagation System

Figure 1:
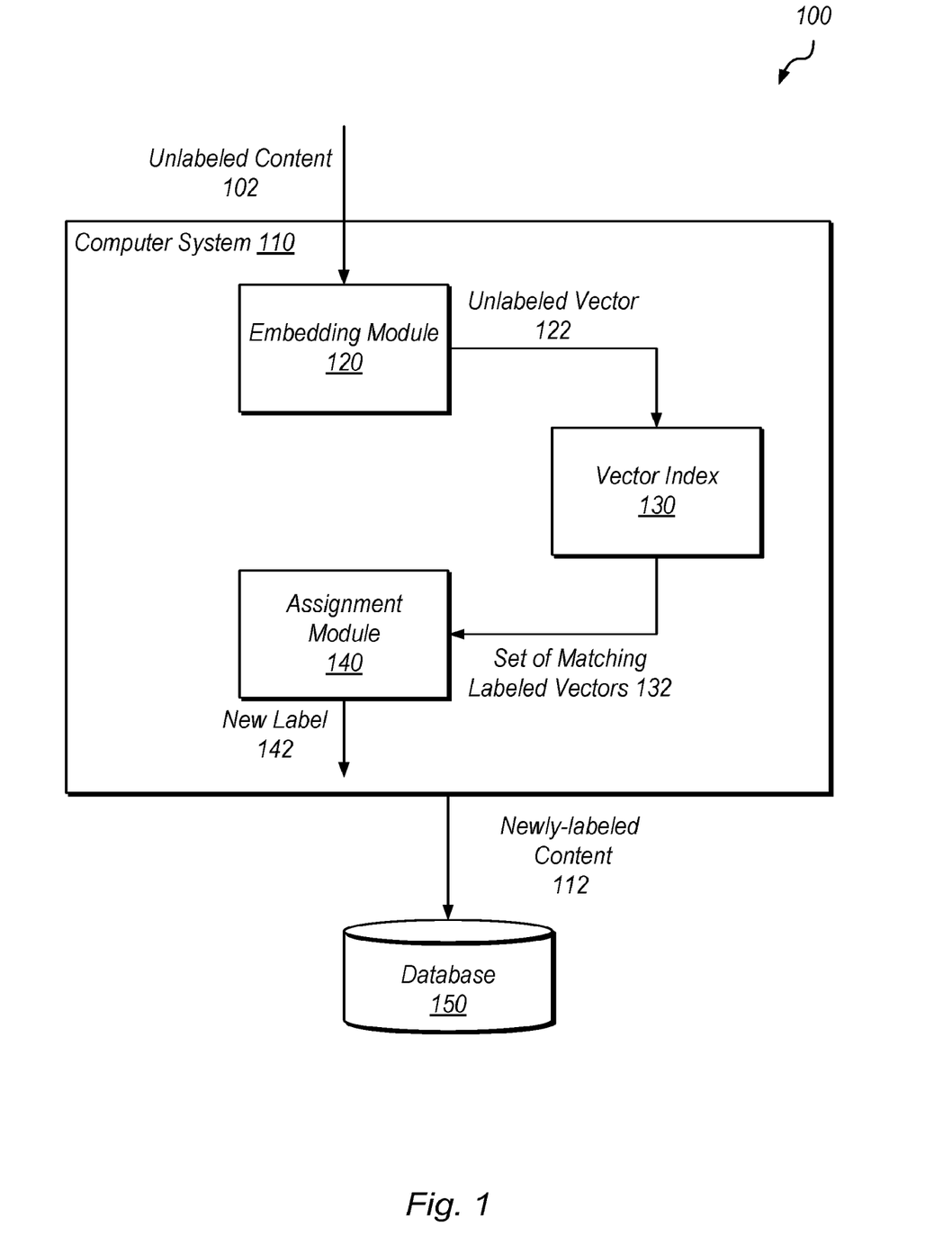
FIG. 1 is a block diagram illustrating an example computer system configured to assign new labels to unlabeled content, according to some embodiments.

FIG. 1 is a block diagram illustrating an example computer system configured to assign new labels to unlabeled content. In the illustrated embodiment, system 100 includes database 150 and computer system 110, which in turn includes embedding module 120, vector index 130, and assignment module 140.

Embedding module 120, in the illustrated embodiment, embeds unlabeled content 102 to generate unlabeled vector 122. As discussed above, the unlabeled content may be user-generated content. Unlabeled content 102 includes a particular portion of content generated by a user, such as a document. Particular portions of user-generated content may be referred to as utterances, which includes text generated from a chain of spoken language.

Examples of such language include phrases such as "I'd like to buy some boots," "Where is the closest grocery store?" "What is my current location?" etc. Embedding module 120 may include any of various machine learning models, including machine translation models such as GOOGLE's Universal Sentence Encoder, FACEBOOK's InferSent, USE, BERT, ELMo, SciBERT, etc.

An encoder included in embedding module 120 attempts to understand the semantic meaning of content and provides a representation of the content based on a determined meaning. For example, in the illustrated embodiment, embedding module 120 generates a vector representation (unlabeled vector 122) of unlabeled content 102 after determining a semantic meaning associated with the content. As used herein, the term "embedding" refers to a set of natural language processing techniques which include mapping user-generated content to vectors of real numbers. For example, embedding may mathematically map content in the text space associated with a high number of dimensions to a continuous vector space associated with a lower number of dimensions. As such, a vector generated by embedding module 120 may include a set of real numbers.

Computer system 110 maintains a vector index 130 storing vector representations of labeled content stored in database 150. For example, computer system 110 may use embedding module 120 to generate vector representations of various labeled content stored in database 150 and then stores these vector representations in vector index 130. Using vector index 130, computer system 110 determines a set 132 of labeled vectors that match the unlabeled vector 122. Determination of this set of vectors is discussed in further detail below with reference to FIG. 2. Computer system 110 provides this set 132 of matching labeled vectors to assignment module 140 in the illustrated embodiment.

Assignment module 140, in the illustrated embodiment, determines and assigns a new label 142 to the unlabeled content 102 based on labels of vectors in set 132. For example, assignment module 140 may determine a matching vector in set 132 that is the most similar to unlabeled vector 122 and assign the label of this matching vector to vector 122. Details for determining new labels such as label 142 for unlabeled content are discussed in further detail below with reference to FIG. 4. Computer system 110 stores the newly-labeled content 112 in database 150. Database 150 stores a small set of labeled content, including the newly-labeled content 112. This labeled content may include content in different languages. In some embodiments, database 150 stores both labeled and unlabeled content. Database 150 may be any of various storage systems, including a distributed structured query language (SQL)-based storage system that stores unlabeled user-generated content via batch jobs, for example.

In disclosed embodiments, new labels are determined for unlabeled content based on their semantic meanings. In traditional techniques, the amount of available labeled content is limited and, as a result, there is not enough labeled training data to train machine learning classifiers to classify various user-generated content. The disclosed information retrieval techniques automatically infer labels for unlabeled content based on the semantic meaning of labeled content by comparing labeled and unlabeled content in the vector space. This may advantageously provide a greater amount of labeled content which may be used for training machine learning classifiers.

While traditional IR systems rely on keyword matching to determine the meaning of a user query, the disclosed IR system compares the semantic meanings of labeled and unlabeled content. For example, a traditional IR system might label the utterance "I would like to refund a payment I have already made" as "refund," while the disclosed IR system might label this utterance as "cancel payment." In this example, the semantic meaning of this utterance may be equivalent to "cancelling a completed payment" rather than "refund on purchases for which items were not received." Using a semantic-aware vector space, the disclosed IR system is able to more accurately label user-generated content relative to traditional techniques.

In this disclosure, various "modules" operable to perform designated functions are shown in the figures and described in detail above (e.g., embedding module 120, assignment module 140, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Determining labels for unlabeled content based on comparing labeled and unlabeled content in the vector space may advantageously provide more accurate labels relative to traditional labeling techniques. In addition, machine learning classifiers trained using content labeled using the disclosed techniques may provide accurate classifications of unlabeled user-generated content based on their semantic meanings. Further, the disclosed techniques may advantageously be applied to multiple different languages independent of translation between languages, which in turn may speed up the process of determining labels for unlabeled content.

Example IR System

Figure 2:
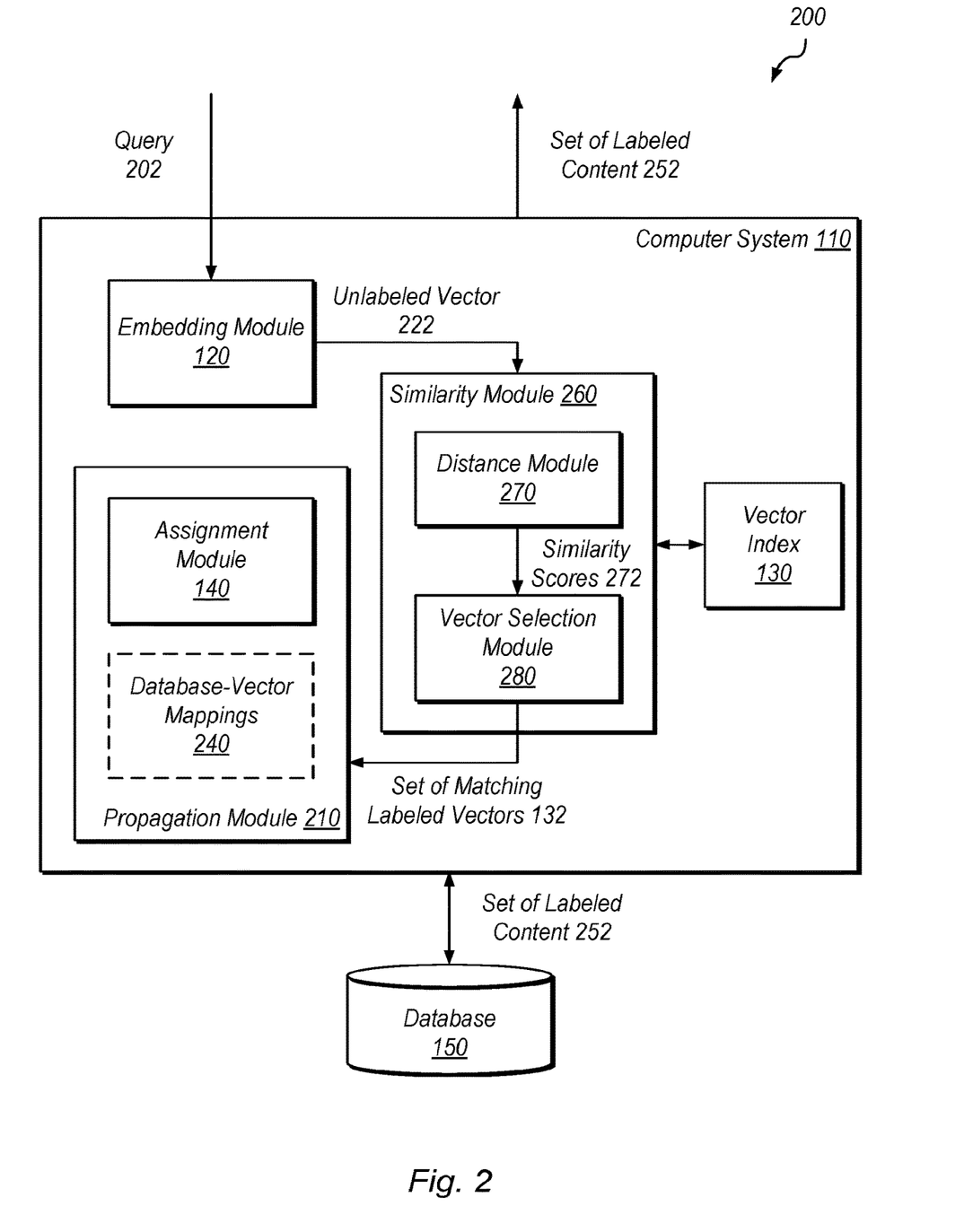
FIG. 2 is a block diagram illustrating an example computer system configured retrieve sets of labeled content for responding to queries, according to some embodiments.

FIG. 2 is a block diagram illustrating an example computer system configured to retrieve sets of labeled content for responding to queries. In the illustrated embodiment, system 200 includes database 150 and computer system 110, which in turn includes embedding module 120, similarity module 260, vector index 130, and propagation module 210.

In the illustrated embodiment, computer system 110 is a vector-based IR system configured to retrieve semantically similar content from a collection of labeled content (e.g., stored in database 150) with respect to a given query. For example, for respective labels, database 150 may store 100 examples of utterances which correspond to these labels. Query 202 may be received by computer system 110 from a training system configured to train machine learning classifiers for used in NLP systems. For example, a training system may use the labeled content as a set of training data. In some embodiments, query 202 specifies a particular unlabeled utterance. Computer system 110 may provide labeled content that matches this utterance. In the illustrated embodiment, embedding module 120 embeds the unlabeled content included in query 202 to generate unlabeled vector 222 and provides this vector to similarity module 260.

Similarity module 260, in the illustrated embodiment, accesses vector index 130 to obtain various labeled vectors for comparison with unlabeled vector 222. Similarity module 260 operates distance module 270 to determine similarity scores 272 for various labeled vectors obtained from vector index 130 based on comparing these vectors with unlabeled vector 222. Distance module 270 scores labeled vectors using a distance metric. Distance module 270 may compare labeled vectors to unlabeled vector 222 using any of various similarity algorithms, including: Euclidean distance, cosine similarity, Jaccard similarity, Minkowski distance, etc.

Based on similarity scores 272, vector selection module 280 determines a set 132 of labeled vectors that match the unlabeled vector. The number of labeled vectors selected by module 280 to be included in set 132 is a tunable parameter. In some embodiments, the tunable parameter is set by a system administrator. In other embodiments, the tunable parameter is determined based on a number of vectors whose similarity scores satisfy a similarity threshold. For example, if five vectors have similarity scores that meet the similarity threshold, then vector selection module 280 includes five vectors in set 132. Vector selection module 280 then provides set 132 of matching labeled vectors to propagation module 210.

Propagation module 210, in the illustrated embodiment, includes assignment module 140 and information specifying mappings 240 between content stored in database 150 and vectors stored in vector index 130. Propagation module 210 compares labeled vectors in the set 132 of matching vectors to database-vector mappings 240 to determine labeled content stored in database 150 corresponding to the vectors included in the set. For example, propagation module 210 may determine database identifiers for content stored in database 150 that correspond to vector representations included in set 132 based on identifiers specified in mappings 240. Using such database identifiers, computer system 110 retrieves a set 252 of labeled content from database 150 and provides this set of content in response to query 202.

In some embodiments, computer system 110 assigns a label to unlabeled content included in query 202. In such situations, set 252 may include a new label for unlabeled content included in query 202. For example, as discussed above with reference to FIG. 1, the assignment module 140 included in propagation module 210 is executable to determine a new label for unlabeled content included in query 202. For example, assignment module 140 may receive unlabeled vector 222 from embedding module 120 and determine a new label for the unlabeled content based on labels of vectors included in set 132. This newly labeled content is then stored by computer system 110 in database 150 and may also be used to respond to query 202.

Example Training System

Figure 3:
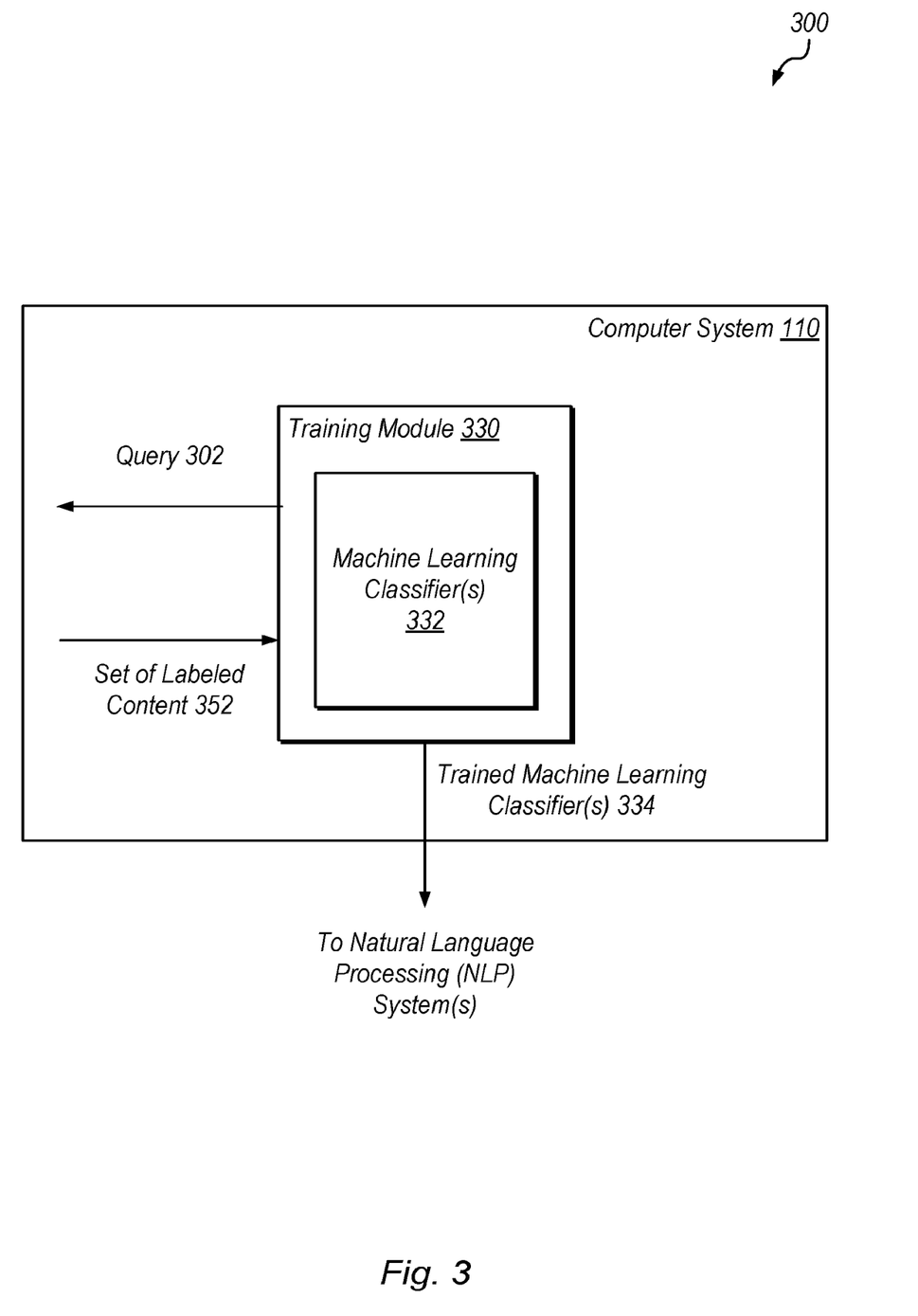
FIG. 3 is a block diagram illustrating an example training module executable to train machine learning classifiers using labeled content, according to some embodiments.

Turning now to FIG. 3, a block diagram is shown illustrating an example training module 330 executable to train machine learning classifiers 332 using labeled content. In the illustrated embodiment, system 300 includes computer system 110, which in turn includes training module 330. In some embodiments, training module 330 is operable by a different system than computer system 110. That is, computer system 110 may provide a set 352 of labeled content to another computer system configured to train machine learning classifiers using training module 330.

Training module 330, in the illustrated embodiment, sends a query 302 for labeled content to be used as training data. Query 302 may be handled by computer system 110 using the techniques discussed above with reference to FIG. 2. In some embodiments, query 302 includes unlabeled content. Training module 330 receives a set 352 of labeled content in response to query 302. Training module 330 is then operable to train one or more machine learning classifiers 332 using the set 352 of labeled content. For example, training module 330 may send a query 302 that specifies a sentence, utterance, symbol, image, document, etc. that does not have a label. Training module 330 may receive various labeled sentences or documents that have similar semantic meanings to the sentence specified in query 302, for example. These sentences may then be used to train machine learning classifiers to recognize user-generated content that has similar semantic meanings to the labeled sentences or documents.

Once training module 330 is satisfied with output of machine learning classifier(s) 332, this module outputs one or more trained machine learning classifiers 334. These trained machine learning classifiers 334 are executable within NLP systems, such as merchant chatbots, to classify user queries relating to, for example, products in order to automatically provide appropriate responses e.g., product offerings, specials, promotions, etc. to customers.

Note that various examples herein specify processing of user-generated content, but these examples are discussed for purposes of explanation and are not intended to limit the scope of the present disclosure. In other embodiments, any of various types of content may be processed for use in various different systems, including the use of labeled content in machine learning techniques.

Example Propagation Module

Figure 4:
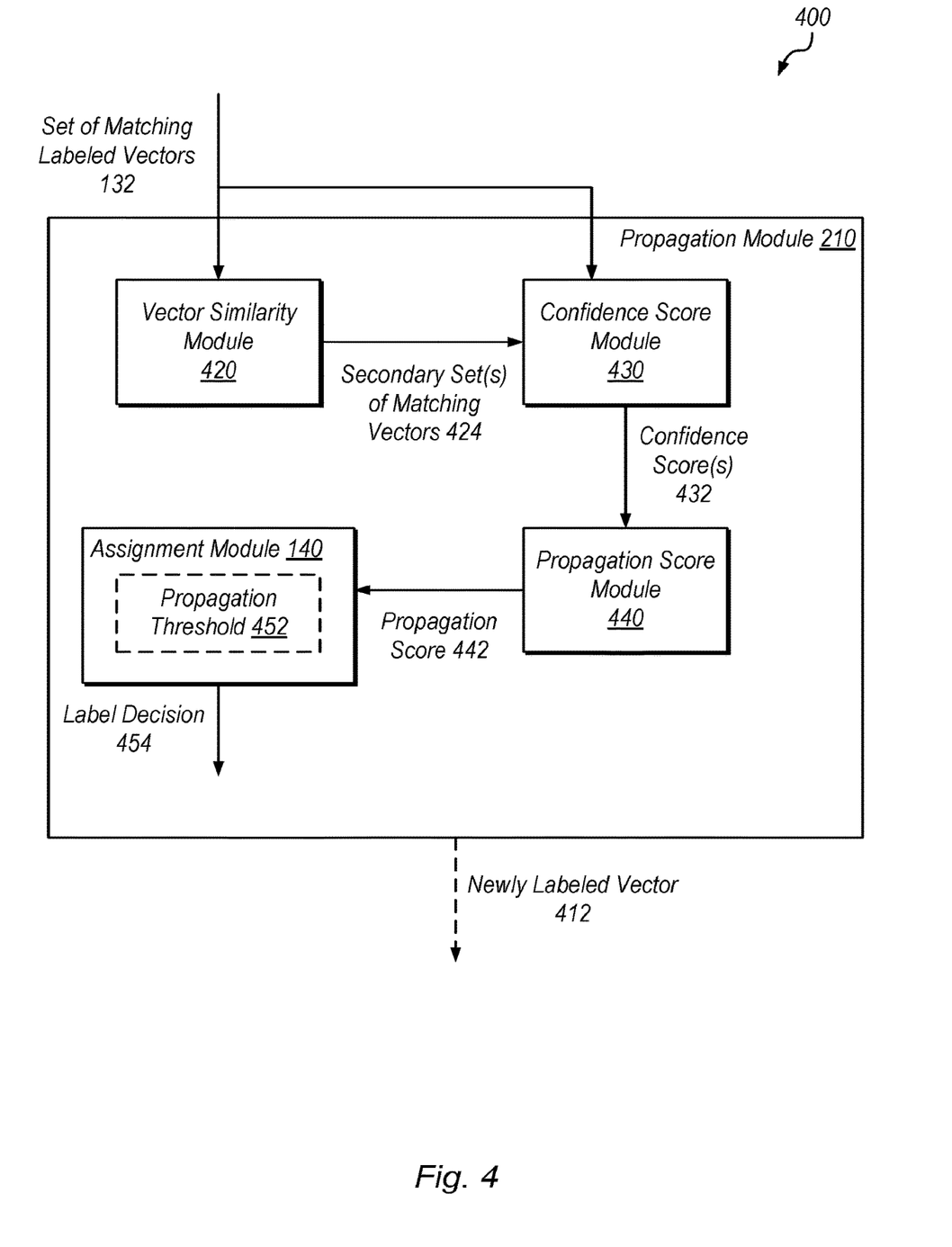
FIG. 4 is a block diagram illustrating an example propagation module, according to some embodiments.

FIG. 4 is a block diagram illustrating an example propagation module 210. In the illustrated embodiment, system 400 includes propagation module 210, which in turn includes vector similarity module 420, confidence score module 430, propagation score module 440, and assignment module 140.

Propagation module 210, in the illustrated embodiment, receives set 132 of matching labeled vectors and provides this set to vector similarity module 420 and confidence score module 430. Vector similarity module 420 determines one or more secondary sets 424 of vectors that match vectors included in set 132 of matching labeled vectors. Similar to the process performed by similarity module 260 shown in FIG. 2, vector similarity module 420 may access vector index 130 to determine the secondary set 424 of matching vectors. For example, vector similarity module 420 may determine a secondary set 424 of matching vectors for each vector included in set 132. Vector similarity module 420 determines, for a given vector included in set 132, a secondary set 424 of vectors that include k-nearest neighbor vectors to the given vector, where k is a tunable parameter. Vector similarity module 420 may employ one or more of the distance techniques discussed above with reference to FIG. 2.

Vector similarity module 420 provides the one or more secondary sets 424 of matching vectors to confidence score module 430. In order to speed up the k-nearest neighbor search, vector similarity module 420 may access a k-nearest neighbor search library. Note that similarity module 260, shown in FIG. 2, may also employ a search library when determining the primary set 132 of matching labeled vectors. This library may be the FAISS library, for example. Note that any of various types of search libraries may be employed for efficiently determining the primary set 132. Examples of both primary and secondary nearest neighbors are discussed below with reference to FIG. 5.

Confidence score module 430, in the illustrated embodiment, compares the labels of vectors in a given secondary set 424 of vectors with the label of their matching vector from set 132. For example, module 430 compares labels of secondary nearest neighbors with the label of their corresponding primary nearest neighbor. Module 430 may generate confidence scores for each vector in set 132. The confidence scores generated by module 430 indicate whether the labels of vectors in set 132 are accurate representations of their respective classes (i.e., whether they have been accurately labeled). As one specific example, if a vector in set 132 has a label A but four out of its five nearest neighbor vectors have a label B, then this vector is not an accurate representation of class A (and may need to be relabeled). These confidence scores may advantageously allow the disclosed system to determine whether labeled vectors stored in database 150 have been erroneously labeled (e.g., by a human annotator or some other labeling system). Based on identifying that a vector needs to be relabeled, computer system 110 may remove the erroneous label of the vector and determine a new label using the disclosed techniques.

Confidence score module 430 uses the following equation to calculate a confidence score for a given vector in set 132:

$$C(x_j^*) = \frac{|\{z_h^* | z_h^* \in T_k^*(x_j^*) \wedge y_h^* = y_j^*\}|}{k} \quad (1)$$

The confidence score provided by equation 1 indicates a number of labeled nearest neighbors (e.g., vectors in a given secondary set 424) of $x^*_j$ (e.g., a vector in the primary set 132 of vectors) whose labels indicate that this vector is an accurate representation of a particular classification $y^*_j$ (the label of $x^*_j$). In equation 1, $z^*_h \in T^*_k(x^*_j)$ represents the k most similar labeled vectors in a given secondary set 424 of vectors with respect to vector $x^*_j$. In addition, in equation 1, $y^*_h = y^*_j$ represents the comparison of labels of secondary nearest neighbors $z^*_h$ in the given secondary set 424 and the label of their matching primary vector $x^*_j$. In equation 1, the value of $\{z^*_h | z^*_h \in T^*_k(x^*_j) \wedge y^*_h = y^*_j\}$ represents which vectors in the given secondary set 424 have the same label $(y^*_j)$ as the vector $x^*_j$. In equation 1, the value of $|\{z^*_h | z^*_h \in T^*_k(x^*_j) \wedge y^*_h = y^*_j\}|$ indicates the number of elements present in the given secondary set 424 that have the same label as vector $x^*_j$. In equation 1, k is the number of vectors included in the secondary set 424 of vectors. Therefore, $C(x^*_j)$ provides a final confidence score for a given vector $x^*_j$ in the primary set 132 of vectors normalized between 0 and 1. As one specific example, if four out of five vectors included in the given secondary set 424 have the same label as a particular primary vector $x^*_j$, then the final confidence score for this particular primary vector is 0.8.

Propagation score module 440, in the illustrated embodiment, receives confidence scores for primary vectors included in set 132 and generates a propagation score 442. This propagation score indicates whether a proposed label (e.g., one of the labels of vectors in set 132) should be assigned to unlabeled vector 122. For example, in order for a proposed label to be assigned to an unlabeled vector 122, the labeled nearest neighbors of vector 122 need to be accurate representations of a class associated with the proposed label. That is, in order for the unlabeled vector 122 to belong to class A, for example, this vector needs to be surrounded by labeled examples that are accurate representations of class A.

Propagation score module 440 uses the following equations to calculate propagation score 442 for a proposed label:

$$s(x_i, y_i) = \sum_{j \in T_k^*(x_i^*)} C(x_j^*) * I(y_j^*, y_i) \quad (2)$$

$$I(y_j^*, y_i) = \begin{cases} 1 \text{ if and only if } y_j^* = y_i^* \\ 0 \text{ otherwise} \end{cases} \quad (3)$$

In equation 2, $C(x^*_j)$ is a confidence score 432 generated by module 430 for respective primary vectors $x^*_j$ in set 132, representing the confidence that these vectors are accurate representations of their respective classes $y^*_j$ (the labels of vectors $x^*_j$). In equations 2 and 3, $I(y^*_j, y_i)$ is an indicator function that indicates whether the labels of the nearest neighbor vectors of vector $x_i$ (the unlabeled vector 122) are the same as the proposed label $y_i$. This indicator function is equal to 1 if and only if the label of a given nearest neighbor vector is the same as the proposed vector and is 0 otherwise. In equation 2, $C(x^*_j)*I(y^*_j, y_i)$ indicates a confidence that the unlabeled vector 122 $(x_i)$ belongs to class $y_i$. In equation 2, $s(x_i, y_i)$ indicates the confidence that vector $x_i$ belongs to class $y_i$ based on the fact that the nearest neighbor vectors of vector $x_i$ also belong to class $y_i$. In the illustrated embodiment, propagation score module 440 provides propagation score 442 to assignment module 140.

Assignment module 140, in the illustrated embodiment, compares the propagation score 442 with a propagation threshold 452. Based on the comparison, assignment module 140 outputs a label decision 454. For example, if propagation score 442 satisfies the threshold 452, then decision 454 will indicate that the proposed label $y_i$ should be assigned to the unlabeled vector 122. If the propagation score 442 does not satisfy the threshold 452, then assignment module 140 indicates that this label should be discarded. For example, the propagation score 442 may be a value that is less than the threshold 452 and, therefore, does not meet this threshold. Note that propagation threshold 452 is a tunable hyperparameter. Propagation threshold may be tuned by a system administrator based on a desired accuracy of labels. For example, for more accurate labels, a high propagation threshold may be selected. As one specific non-limiting example, on a scale of 0 to 1, the propagation threshold may be selected as 0.85. In this specific example, propagations scores above 0.85 indicate that a label is highly accurate and may be assigned to an unlabeled vector.

In some embodiments, propagation module 210 determines a propagation score 442 for various different proposed labels for a given unlabeled vector 122. For example, the disclosed system may not know whether a proposed label is an accurate candidate for an unlabeled vector 122. Thus, propagation module 210 may determine propagation scores for a plurality of possible proposed labels before find an accurate match.

In the illustrated embodiment, if the proposed label satisfies the threshold 452, propagation module 210 outputs a newly labeled vector 412. Propagation module 210 may then access database-vector mappings 240 to determine content corresponding to the newly labeled vector 412. Once the corresponding content has been identified, computer system 110 may store the newly labeled content in database 150. In embodiments where propagation scores 442 associated with various proposed labels for a given unlabeled vector do not satisfy propagation threshold 452, computer system 110 may throw out the unlabeled vector altogether and begin the labeling process with a different unlabeled vector.

In one specific example, if the confidence scores for three different nearest neighbor vectors included in set 132 are 0.8, 0.5, and 1, and all of the labels for these vectors match a proposed label for an unlabeled vector 122, then the propagation score 442 for this proposed label is 2.3. In this specific example, if the propagation threshold 452 is 2, then the propagation score 2.3 for this proposed label satisfies the threshold. Thus, in this specific example the proposed label will be assigned to the unlabeled vector 122.

Figure 5:
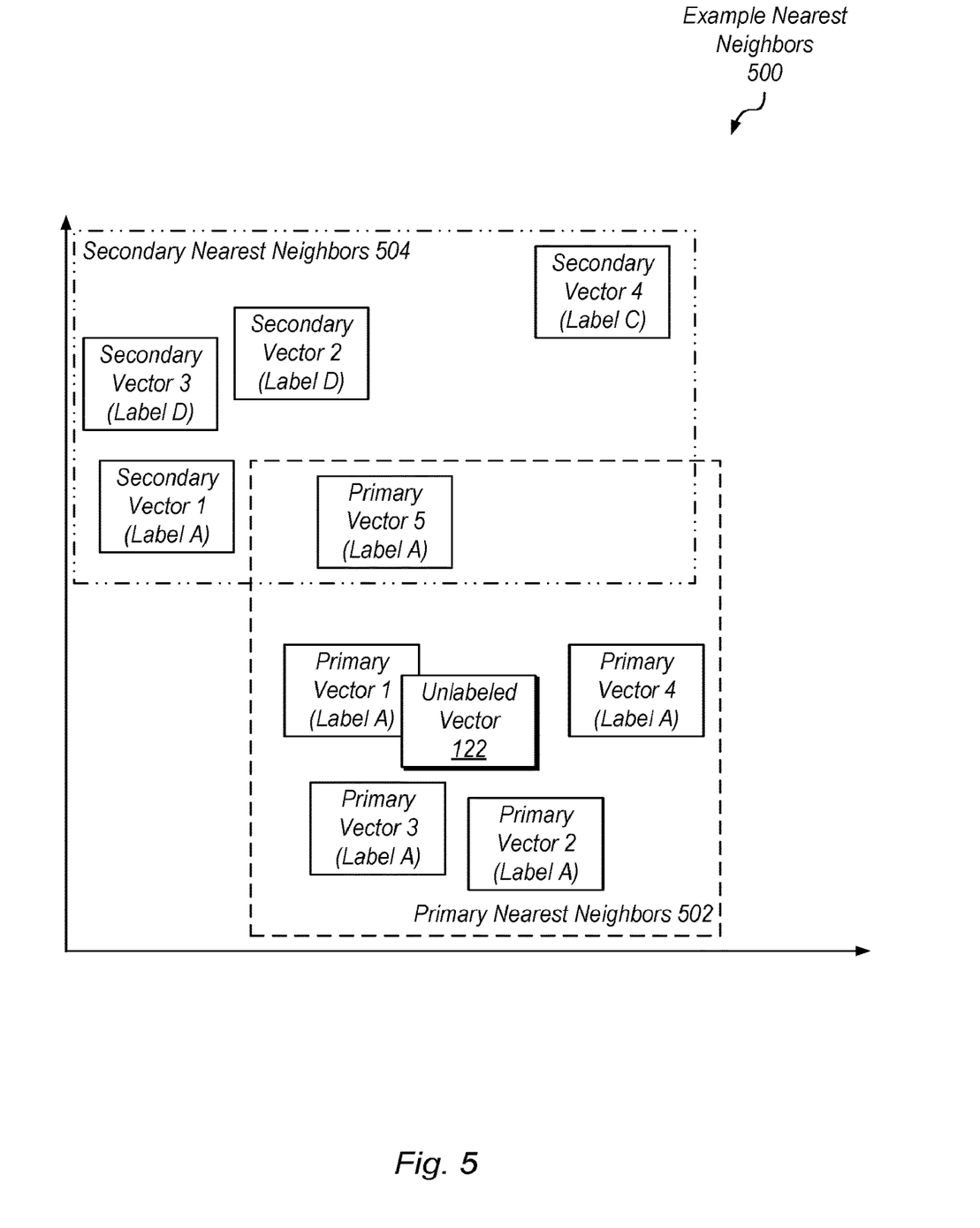
FIG. 5 is a diagram illustrating example nearest neighbor vectors of an unlabeled vector, according to some embodiments.

Turning now to FIG. 5, a diagram is shown illustrating example nearest neighbors of an unlabeled vector 122. In the illustrated embodiment, example 500 includes both primary nearest neighbors 502 and secondary nearest neighbors 504.

In the illustrated embodiment, unlabeled vector 122 is shown with five primary nearest neighbors 502 (primary vectors 1-5) which each have a label of A. This set of primary vectors may be referred to as a coherent cluster because these vectors belong to the same class. Primary vector 5 is shown with four secondary nearest neighbors 504 (secondary vectors 1-4). Secondary vectors 1 and 2 have label D, secondary vector 1 has label A, and secondary vector 4 has a label C. Primary vector 5 may be associated with a low confidence score since three of its nearest neighbor vectors are associated with labels other than label A. As a consequence, even though primary vector 5 is associated with class A, it is identified as a poor representation of classification A. Because the low confidence score for primary vector 5 is used in calculating the propagation score for label A (i.e., whether label A should be assigned to unlabeled vector 122), this low confidence score may produce a low propagation score. Based on the low propagation score, the disclosed system may decide not to label unlabeled vector 122 with label A. In some situations, if multiple primary vectors of unlabeled vector 122 have low confidence scores, this will result in a low propagation score. In this situation, label A is not assigned to unlabeled vector 122. Note that primary vectors 1-4 may also have respective sets of secondary nearest neighbors although these vectors are not shown in the example of FIG. 5.

Example NLP System

Figure 6:
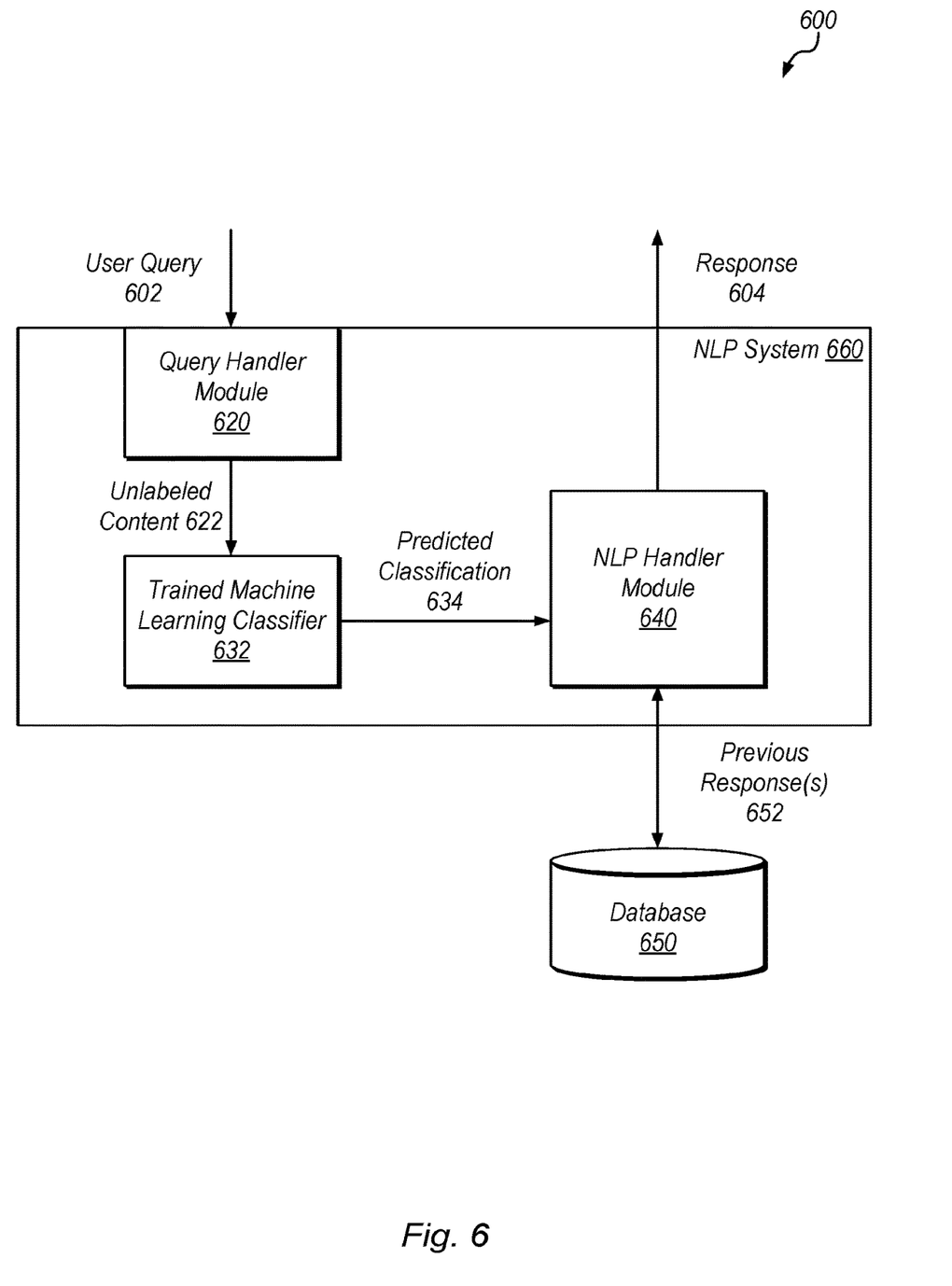
FIG. 6 is a block diagram illustrating an example NLP system, according to some embodiments.

FIG. 6 is a block diagram illustrating an example NLP system 660. In the illustrated embodiment, system 600 includes database 650 and NLP system 660, which in turn includes a query handler module 620, a trained machine learning classifier 632, and an NLP handler module 640.

NLP system 660, in the illustrated embodiment, receives a user query 602 and provides a response 604 to the user query. System 660 generates response 604 based on classifications provided by trained machine learning classifier 632 for content of user query 602. Query handler module 620 receives user query 602 and extracts unlabeled user-generated content 622 from the query. Trained machine learning classifier 632 in the illustrated embodiment generates a predicted classification 634 for the unlabeled content 622. For example, trained machine learning classifier 632 may predict a label for the unlabeled content 622. Note that trained machine learning classifier 632 may be trained using the techniques discussed above with reference to FIG. 3.

NLP handler module 640, in the illustrated embodiment, receives predicted classification 634 from classifier 632. NLP handler module 640 retrieves one or more previous responses 652 from database 650 based on classification 634. NLP handler module 640 may respond using a previous response or may formulate a new response based on the classification and previous responses used for similarly classified unlabeled content. As one specific example, if NLP system 660 is a chat bot executed on a merchant website and a user asks the chat bot for shipping costs to San Jose, California, the predicted classification for this query may indicate a semantic meaning related to shipping. NLP handler module 640, in this specific example, locates previous responses relating to shipping costs in similar locations in California for use in customizing a new response to the current user query. Consider another example where a user submits a query asking for "high quality shoes for a funeral." In this example, the NLP handler would locate previous responses relating to black leather or formal dress shoes with excellent ratings (e.g., 5-star customer ratings) and provides product information for such shoes in response to the funeral query.

Example Methods

Figure 7:
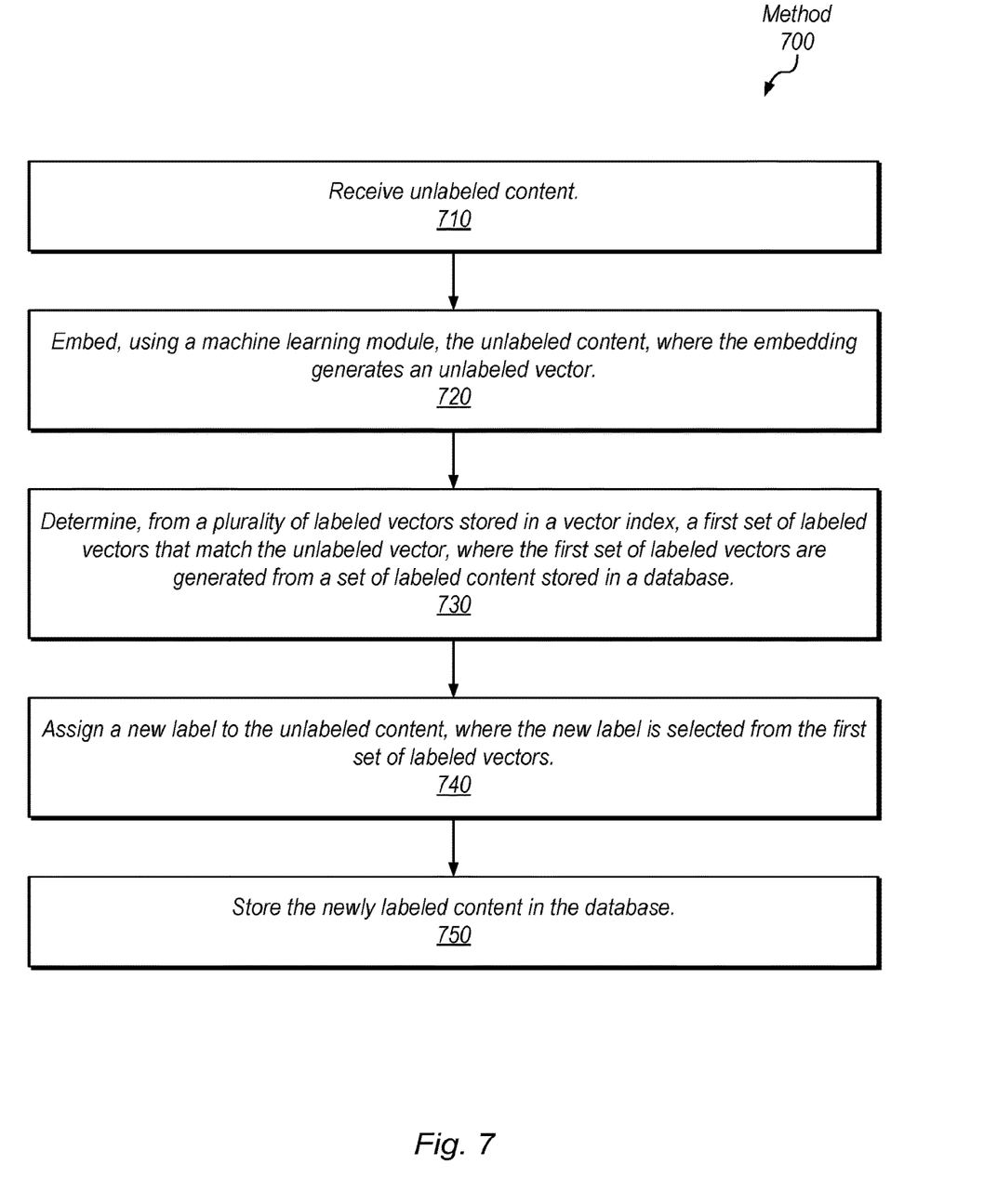
FIG. 7 is a flow diagram illustrating a method for assigning labels to unlabeled content based on determining matches between labeled and unlabeled content in the vector space, according to some embodiments.

FIG. 7 is a flow diagram illustrating a method for assigning labels to unlabeled content based on determining matches between labeled and unlabeled content in the vector space, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The method elements of FIG. 7 may be performed by the computer system 110 shown in FIG. 1, for example.

At 710, in the illustrated embodiment, a computer system receives unlabeled content. In some embodiments, receiving unlabeled content includes receiving a query. The unlabeled content included in the query may be a document, sentence, a set of terms, etc.

At 720, the computer system embeds, using a machine learning model, the unlabeled content, where the embedding generates an unlabeled vector. The machine learning model may be an encoder of a machine translation model, for example.

At 730, the computer system determines, from a plurality of labeled vectors stored in a vector index, a first set of labeled vectors that match the unlabeled vector, where the first set of labeled vectors are generated from a set of labeled content stored in a database. In some embodiments, determining the first set of labeled vectors is performed using a distance metric. In some embodiments, the machine learning model is an encoder of a machine translation model. In some embodiments, the determining performed using vectors enables determination of semantic similarity between content. In some embodiments, the unlabeled content and the set of labeled content include user-generated content in multiple different languages. In some embodiments, the determining performed using vectors enables determination of semantic similarity between content in multiple different languages.

At 740, the computer system assigns a new label to the unlabeled content, where the new label is selected from the first set of labeled vectors. In some embodiments, the assigning includes determining, for vectors included in the first set of labeled vectors, respective second sets of labeled vectors that match the vectors included in the first set. In some embodiments, the assigning further includes calculating, for respective vectors included in the first set, confidence scores, where the calculating is performed based on determining a number of vectors included in a respective second set of labeled vectors that have the same label as a respective matching vector in the first set of labeled vectors.

In some embodiments, the first set of labeled vectors includes k-nearest neighbor vectors to the unlabeled vector. In some embodiments, the respective second sets of labeled vectors include k-nearest neighbors of respective vectors in the first set of labeled vectors. For example, the k in k-nearest neighbors is a tunable parameter. In some embodiments, the assigning further includes calculating, based on the confidence scores, a propagation score, where the propagation score indicates whether the new label should be assigned to the unlabeled content. In some embodiments, calculating the propagation score includes determining whether the labels of vectors included in the first set match the selected new label. In some embodiments, calculating the propagation score further includes generating, based on the determining, a total confidence score, where the total confidence score is the sum of the confidence scores of vectors included in the first set with labels that match the selected new label. In some embodiments, the assigning further includes comparing the propagation score with a propagation threshold, where the assigning is performed based on the propagation score satisfying the propagation threshold.

At 750, the computer system stores the newly labeled content in the database. In some embodiments, the computer system retrieves, based on the first set of labeled vectors and mappings between the vector index and a database storing labeled content, a set of labeled content from the database. The mappings may indicate a 1-to-1 mapping between vectors stored in the vector index and content stored in the database. In some embodiments, the computer system responds to the query using the set of labeled content.

In some embodiments, the computer system trains one or more machine learning classifiers using labeled content stored in the database, where the one or more trained machine learning classifiers are usable in natural language processing (NLP) systems. The NLP systems may include chat bots, hate speech detectors, etc.

Figure 8:
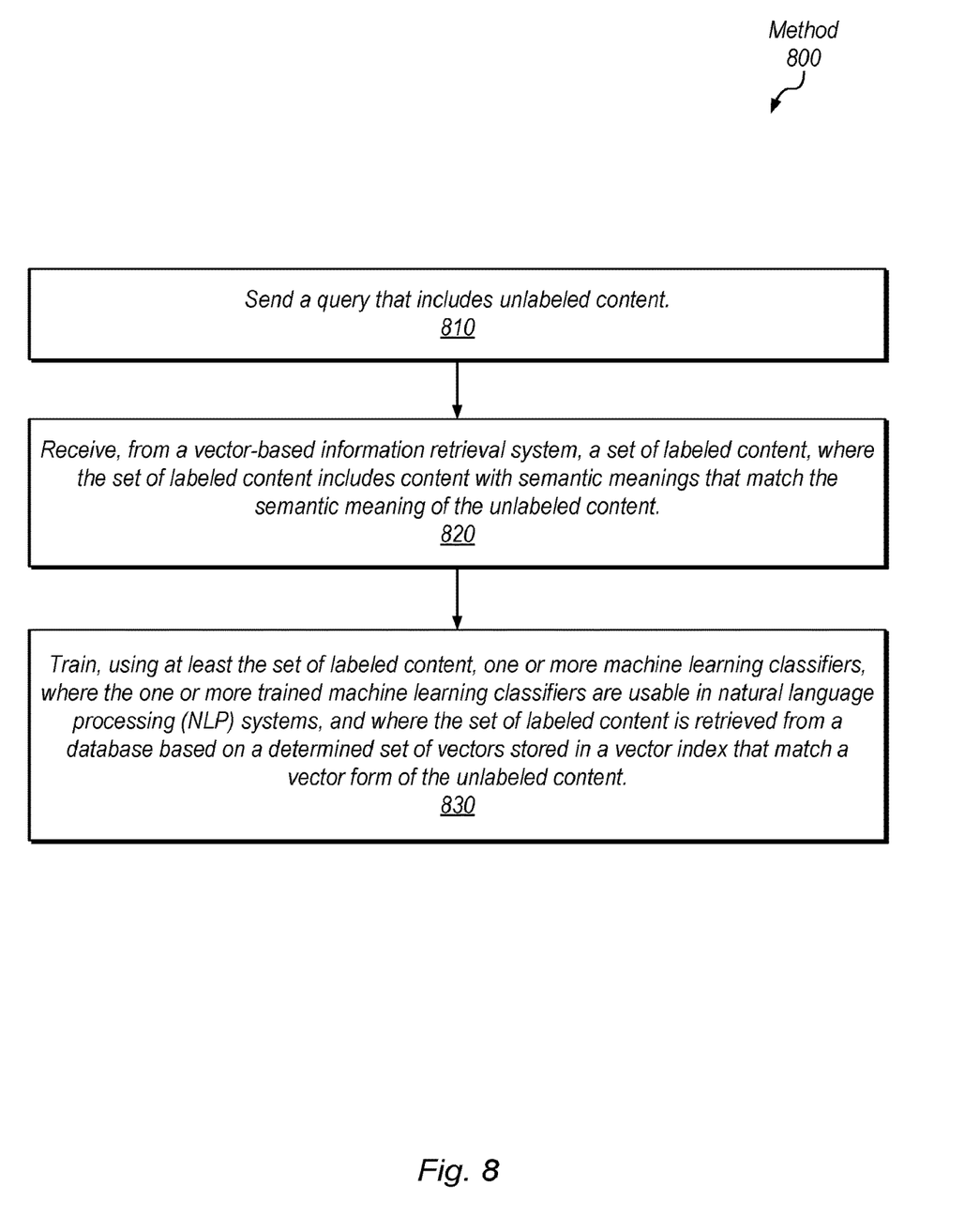
FIG. 8 is a flow diagram illustrating a method for training machine learning classifiers for use in NLP systems, according to some embodiments.

FIG. 8 is a flow diagram illustrating a method for training machine learning classifiers for use in NLP systems, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The method elements of FIG. 8 may be performed by training module 330 shown in FIG. 3, for example.

At 810, in the illustrated embodiment, a computing system sends a query that includes unlabeled content. In some embodiments, the unlabeled content includes user-generated content. In some embodiments, the computing system is a training system configured to train one or more machine learning modules. In some embodiments, the computing system is included in the computer system discussed above with reference to FIG. 7.

At 820, the computing system receives, from a vector-based information retrieval system, a set of labeled content, where the set of labeled content includes content with semantic meanings that match a semantic meaning of the unlabeled content. In some embodiments, the unlabeled content is in a first language and the set of labeled content includes one or more portions of content in at least a second, different language. In some embodiments, the one or more portions of content include user-generated content, including sentences, terms, documents, utterances, etc.

At 830, the computing system trains, using at least the set of labeled content, one or more machine learning classifiers, where the one or more trained machine learning classifiers are usable in natural language processing (NLP) systems. In some embodiments, the set of labeled content is retrieved from a database based on a determined set of labeled vectors stored in a vector index that match a vector form of the unlabeled content.

In some embodiments, determining the set of labeled vectors stored in the vector index is performed by embedding, using a machine learning model, the unlabeled content, where the embedding generates an unlabeled vector. In some embodiments, the determining is further performed by comparing the unlabeled vector with vectors stored in the vector index, where the comparing provides a set of labeled vectors that have semantically similar meanings to the unlabeled vector. In some embodiments, the comparing is performed using a distance metric. In some embodiments, the machine learning model is an encoder of a machine translation model.

Example Computing Device

Figure 9:
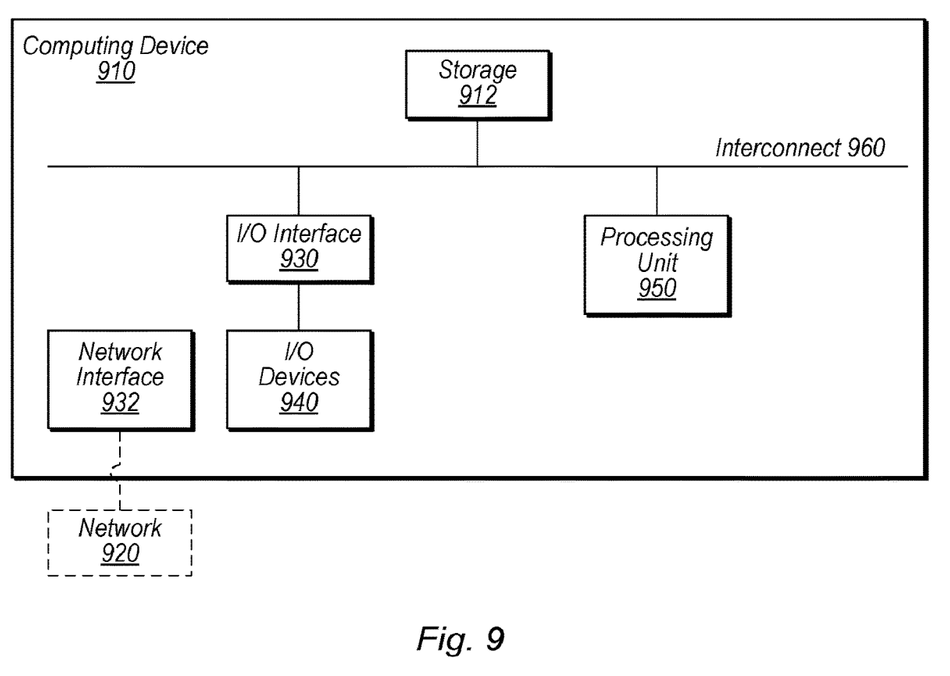
FIG. 9 is a block diagram illustrating an example computing device, according to some embodiments.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. For example, computing device 910 may be a server configured to process natural language included in user queries, such as the processing performed by NLP system 660. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory, in one embodiment. For example, databases 150 and 650 may be operated using any of the various example mediums discussed herein. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such as "a," "an," and "the" are intended to mean "one or more" unless the context clearly dictates otherwise. Reference to "an item" in a claim thus does not preclude additional instances of the item.

The word "may" be used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, a system having a processor unit and a memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

For purposes of United States law, reciting in the appended claims that a structure is "configured to" perform one or more tasks is expressly intended not to invoke 35 U.S.C. § 112(f) for that claim element. Should Applicant wish to invoke Section 112(f) during prosecution in a U.S. application, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A system comprising:
   one or more processors; and
   one or more machine-readable storage media having instructions stored thereon that, in response to being executed by the one or more processors, cause the system to perform operations comprising:
   receiving a user query that includes unlabeled content;
   embedding, using a machine learning model, the unlabeled content, wherein the embedding generates an unlabeled vector;
   determining, from a plurality of labeled vectors stored in a vector index, a first set of labeled vectors that match the unlabeled vector, wherein the first set of labeled vectors are generated from a set of labeled content stored in a database;
   calculating, based on a confidence score for at least one labeled vector in the first set of labeled vectors, a propagation score for the unlabeled vector, wherein the propagation score indicates whether a new label should be assigned to the unlabeled content;
   assigning, based on the propagation score, the new label to the unlabeled content, wherein the new label is selected from the first set of labeled vectors;
   storing the newly labeled content in the database;
   retrieving based on the first set of labeled vectors and mappings between the vector index and the database storing labeled content, a set of labeled content from the database; and
   responding, using the set of labeled content, to the user query.

2. The system of claim 1, further comprising:
   training a machine learning classifier using labeled content stored in the database, wherein the trained machine learning classifier is usable by a chatbot to respond to user queries.

3. The system of claim 2, wherein the chatbot is associated with a merchant and the user queries are associated with a product.

4. The system of claim 1, wherein the assigning includes:
   calculating, for respective vectors included in the first set of labeled vectors, confidence scores, wherein the calculating is performed based on determining a number of vectors included in a respective second set of labeled vectors that have the same label as a respective matching vector in the first set of labeled vectors.

5. The system of claim 4, wherein the first set of labeled vectors includes k-nearest neighbor vectors to the unlabeled vector, and wherein the respective second set of labeled vectors includes k-nearest neighbors of respective vectors in the first set of labeled vectors.

6. The system of claim 5, wherein calculating the propagation score includes:
   determining whether labels of vectors included in the first set match the selected new label; and
   generating, based on the determining, a total confidence score, wherein the total confidence score is the sum of the confidence scores of vectors included in the first set with labels that match the selected new label.

7. The system of claim 1, wherein the determining performed using vectors enables determination of semantic similarity between content in multiple different languages.

8. A method comprising:
   receiving, by a computer system, a user query that includes unlabeled content;
   embedding, by the computer system using a machine learning model, the unlabeled content, wherein the embedding generates an unlabeled vector;
   determining, by the computer system from a plurality of labeled vectors stored in a vector index, a first set of labeled vectors that match the unlabeled vector, wherein the first set of labeled vectors are generated from a set of labeled content stored in a database;
   calculating, based on confidence scores for vectors in the first set of labeled vectors, a propagation score for the unlabeled vector, wherein the propagation score indicates whether a new label should be assigned to the unlabeled content;
   assigning, by the computer system based on the propagation score, the new label to the unlabeled content, wherein the new label is selected from the first set of labeled vectors;
   storing, by the computer system, the newly labeled content in the database;
   retrieving, by the computer system based on the first set of labeled vectors and mappings between the vector index and the database storing labeled content, a set of labeled content from the database; and responding, by the computer system using the set of labeled content, to the user query.

9. The method of claim 8, further comprising:
training a machine learning classifier using labeled content stored in the database, wherein the trained machine learning classifier is usable by a chatbot to respond to user queries.

10. The method of claim 9, wherein the chatbot is associated with a merchant and the user queries are associated with a product.

11. The method of claim 8, wherein the assigning includes:
calculating, for respective vectors included in the first set of labeled vectors, confidence scores, wherein the calculating is performed based on determining a number of vectors included in a respective second set of labeled vectors that have the same label as a respective matching vector in the first set of labeled vectors.

12. The method of claim 11, wherein the first set of labeled vectors includes k-nearest neighbor vectors to the unlabeled vector, and wherein the respective second set of labeled vectors includes k-nearest neighbors of respective vectors in the first set of labeled vectors.

13. The method of claim 12, wherein calculating the propagation score includes:
determining whether labels of vectors included in the first set match the selected new label; and
generating, based on the determining, a total confidence score, wherein the total confidence score is the sum of the confidence scores of vectors included in the first set with labels that match the selected new label.

14. The method of claim 8, wherein the determining performed using vectors enables determination of semantic similarity between content in multiple different languages.

15. A non-transitory computer-readable medium having instructions stored thereon that are executable by a computer device to perform operations comprising:
receiving a user query that includes unlabeled content;
embedding, using a machine learning model, the unlabeled content, wherein the embedding generates an unlabeled vector;
determining, from a plurality of labeled vectors stored in a vector index, a first set of labeled vectors that match the unlabeled vector, wherein the first set of labeled vectors are generated from a set of labeled content stored in a database;
calculating, based on a confidence score for at least one labeled vector in the first set of labeled vectors, a propagation score for the unlabeled vector, wherein the propagation score indicates whether a new label should be assigned to the unlabeled content;
assigning, based on the propagation score, the new label to the unlabeled content, wherein the new label is selected from the first set of labeled vectors;
storing the newly labeled content in the database;
retrieving, based on the first set of labeled vectors and mappings between the vector index and the database storing labeled content, a set of labeled content from the database; and
responding, using the set of labeled content, to the user query.

16. The non-transitory computer-readable medium of claim 15, wherein the operations further comprise:
training a machine learning classifier using labeled content stored in the database, wherein the trained machine learning classifier is usable by a chatbot to respond to user queries.

17. The non-transitory computer-readable medium of claim 15, wherein the assigning includes:
calculating, for respective vectors included in the first set of labeled vectors, confidence scores, wherein the calculating is performed based on determining a number of vectors included in a respective second set of labeled vectors that have the same label as a respective matching vector in the first set of labeled vectors.

18. The non-transitory computer-readable medium of claim 17, wherein the first set of labeled vectors includes k-nearest neighbor vectors to the unlabeled vector, and wherein the respective second set of labeled vectors includes k-nearest neighbors of respective vectors in the first set of labeled vectors.

19. The non-transitory computer-readable medium of claim 18, wherein calculating the propagation score includes:
determining whether labels of vectors included in the first set match the selected new label; and
generating, based on the determining, a total confidence score, wherein the total confidence score is the sum of the confidence scores of vectors included in the first set with labels that match the selected new label.

20. The non-transitory computer-readable medium of claim 15, wherein the determining performed using vectors enables determination of semantic similarity between content in multiple different languages.

* * * * *